Figure 1:
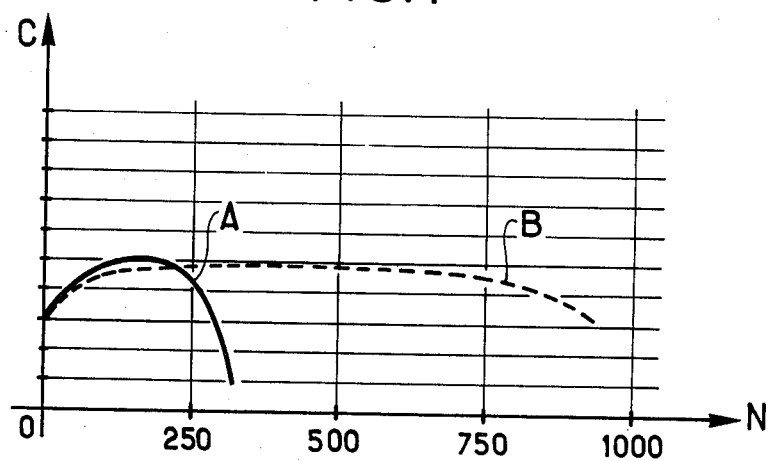

United States Patent [19]

Chenaux et al.

[11] 4,297,420
[45] Oct. 27, 1981

[54] ELECTRODE FOR A LEAD ACCUMULATOR

[75] Inventors: Bernard Chenaux, Paris; Alain Leroux, St-Chéron, both of France

[73] Assignee: Compagnie Generale d'Electricite, Paris, France

[21] Appl. No.: 190,401

[22] Filed: Sep. 24, 1980

Related U.S. Application Data

[63] Continuation of Ser. No. 86,447, Oct. 19, 1979, abandoned.

[30] Foreign Application Priority Data

Oct. 27, 1978 [FR] France ................ 78 30591

[51] Int. Cl.³ ............................................. H01M 4/62
[52] U.S. Cl. ..................................... 429/217; 429/228
[58] Field of Search ............... 429/217, 212, 213, 216, 429/225-228

[56] References Cited

U.S. PATENT DOCUMENTS

| | | | |
|---|---|---|---|
| 2,866,840 | 12/1958 | Dittmann et al. | 136/26 |
| 3,496,020 | 2/1970 | Jackson et al. | 429/217 |
| 3,871,918 | 3/1975 | Viescou | 429/212 X |
| 3,918,989 | 11/1975 | Gillman et al. | 429/215 X |
| 4,146,685 | 3/1979 | Tucholsli | 429/217 X |
| 4,168,352 | 9/1979 | Dick et al. | 429/225 X |
| 4,175,052 | 11/1979 | Norteman, Jr. | 429/212 X |

FOREIGN PATENT DOCUMENTS

| | | |
|---|---|---|
| 1080243 | 5/1954 | France . |
| 2093264 | 1/1972 | France . |
| 2279231 | 3/1977 | France . |
| 1047395 | 11/1966 | United Kingdom . |

OTHER PUBLICATIONS

"Chem. Abs.", Abs. No. 182, 420b, vol. 84, No. 26, p. 130, (1976).

Primary Examiner—Charles F. LeFevour
Attorney, Agent, or Firm—Kenyon & Kenyon

[57] ABSTRACT

The invention relates to an electrode for a lead accumulator. It includes an electronically conductive core coated with an active material which contains grains of lead monoxide, lead sulphate and a binding agent which is suitable for forming a three-dimensional thread-like network, characterized in that said electrode further includes a material which is insoluble in sulphuric acid and permeable to conductivity ions, the material being chosen from the group which includes polyacrylic acid and hydroxyethylmethacrylate and being used in a proportion by weight of 0.25 to 2% with respect to said lead monoxide.

3 Claims, 2 Drawing Figures

ELECTRODE FOR A LEAD ACCUMULATOR

This is a continuation of application Ser. No. 086,447 filed on Oct. 19, 1979 now abandoned.

The present invention relates to an electrode for a lead accumulator and particularly the positive electrode of such an accumulator.

It also relates to a method of preparing such an electrode.

It is known that to manufacture such an electrode, firstly, a past is formed which contains litharge, water and sulphuric acid. Then the paste is disposed on a grating, the whole then being matured at a determined temperature. At this stage, the electrode is therefore in the form of a grating coated with a porous cement whose mechanical strength is satisfactory.

However, it is observed that during a number of charge-discharge cycles, the mechanical strength of such a cement decreases appreciably, whence material drops to the bottom of the container and the capacity of the electrode is substantially reduced.

With a view to remedying such a disadvantage, it has been proposed to add a binding agent to the paste, in particular polytetrafluoroethylene (PTFE). Such a substance forms a three-dimensional network of fibres within the texture. This retains the particles of material and consequently limits the dropping thereof to the bottom of the container.

However, the proportion of PTFE thus added must remain limited to between 1 and 5% by weight; otherwise, the capacity of the electrode is appreciably reduced.

Nevertheless, such proportions do not adequately limit the amount of material which drops to the bottom of the container and hence do not adequately limit the reduction in capacity of the electrode.

It is therefore easy to understand that if all the grains of material were coated with a film of plastics material, the above-mentioned disadvantages would be avoided, but in that case, the ion exchanges with the electrolyte would be very greatly reduced or even eliminated, and the electrical contact between the grains would be practically nonexistant.

The present inventors therefore have sought a material suitable for consolidating the action of the PTFE by forming a membrane or film round the grains which is permeable to the electrolyte and has low electrical resistance, so that the grains do not drop, or drop slowly, and so that the electrochemical process can take place freely, such advantageous properties persisting after a repeated number of charge-discharge cycles.

The invention therefore provides an electrode for a lead accumulator of the type which includes an electronically conductive core coated with an active material which contains grains of lead monoxide, lead sulphate and a binding agent which is suitable for forming a three-dimensional network of fibres, wherein said electrode further includes a material which is insoluble in sulphuric acid, is permeable to conductivity ions and is capable of forming a film over said grains, the material being chosen from the group which includes polyacrylic acid and hydroxyethylmethacrylate and being used in a proportion by weight of 0.25 to 2% with respect to said lead monoxide.

The invention also provides a method of preparing such an electrode wherein the following successive operations are performed:

a paste is formed by stirring a mixture of lead monoxide powder, sulphuric acid and water in which about 0.25 to 2% by weight of polyacrylic acid or hydroxyethylmethacrylate with respect to said lead monoxide is previously dissolved;

polytetrafluoroethylene is added to said paste after stirring so that the content of this substance lies between 1 and 5% by weight with respect to said lead oxide;

an electronically conductive core is coated with the paste; and the electrode is matured.

Figure 2:
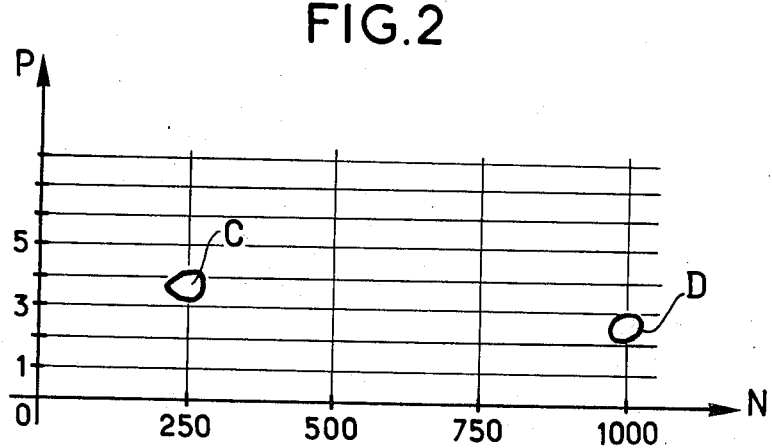

Examples of the invention are described with reference to the accompanying drawing in which FIGS. 1 and 2 are graphs.

The inventors have found that polyacrylic acid and hydroxyethylmethacrylate are able to substantially overcome the previously mentioned disadvantages. These two products will hereinafter be designated by the initials APA and HEMA respectively.

Indeed, after evaporation, such compounds, which are soluble in water, are capable of forming a film around the grains of electrode material. The film is firstly insoluble in sulphuric acid and secondly permeable to $SO_4^{2-}$ ions and in general to conductivity ions.

Consequently, to form an electrode in accordance with the invention, a conventional method is used to make a paste from litharge powder PbO, sulphuric acid and water in which 0.25 to 2% and preferably 1% by weight of APA or HEMA with respect to the weight of the lead monoxide is previously dissolved. When stirring is ended, PTFE is added to the paste so that the PTFE content in the paste lies between about 1 and 5% and preferably 2.5% by weight with respect to the weight of the lead monoxide.

Then, a conductive core or a grid is covered with paste in a known manner. Lastly, the electrode undergoes a maturing treatment such as heat treatment at 60° in a damp atmosphere so as to eliminate most of the water, to oxidize the residual free lead and to develop a network of basic sulphates which provide for the cohesion of the paste. The electrode is then ready for installation in a battery.

It is in the form of a grid coated with active material which includes grains of lead oxide, lead sulphate, basic sulphates, PTFE and APA or HEMA in respective proportions such as mentioned hereinabove.

In order to illustrate better the advantages of the invention, FIG. 1 illustrates the variation in the capacity C expressed in arbitrary units as a function of the number N of charge and discharge cycles. The curve A shows that for a conventional electrode, the capacity decreases very greatly after 250 cycles. In contrast, the curve B shows that for an electrode in accordance with the invention the capacity is still high after 1000 cycles.

FIG. 2 illustrates in arbitrary units the quantity P of material which drops to the bottom of the container as a function of the number N of charge-discharge cycles. More precisely, the area C relates to a conventional electrode while the area D relates to an electrode in accordance with the invention. It is therefore seen that after 1000 cycles, an electrode in accordance with the invention loses little material, contrary to a conventional electrode, in which said loss is very high after only 250 cycles.

It is therefore apparent that an electrode in accordance with the invention can withstand a large number of charge-discharge cycles while maintaining its initial capacity, and while losing a minimum quantity of material.

The invention is used in lead accumulators.

We claim:

1. An electrode for a lead accumulator of the type which includes an electronically conductive core coated with an active material which contains grains of lead monoxide, lead sulphate and a binding agent which is suitable for forming a three-dimensional network of fibres, wherein said electrode further includes a material which is insoluble in sulphuric acid, is permeable to conductivity ions and forming a film over said grains, the material being chosen from the group which includes polyacrylic acid and hydroxyethylmethacrylate and being used in a proportion by weight of 0.25 to 2% with respect to said lead monoxide.

2. An electrode according to claim 1, wherein said binding agent contains polytetrafluoroethylene and is used in a proportion by weight which lies between 1 and 5% with respect to the lead monoxide.

3. An accumulator which includes at least one electrode according to claim 1 or 2.

* * * * *